March 31, 1964  T. W. CARSKADON  3,126,658
TROUSER LEG PRESSING MACHINE

Filed Jan. 9, 1962  9 Sheets-Sheet 1

INVENTOR
T. W. CARSKADON

BY
ATTORNEYS

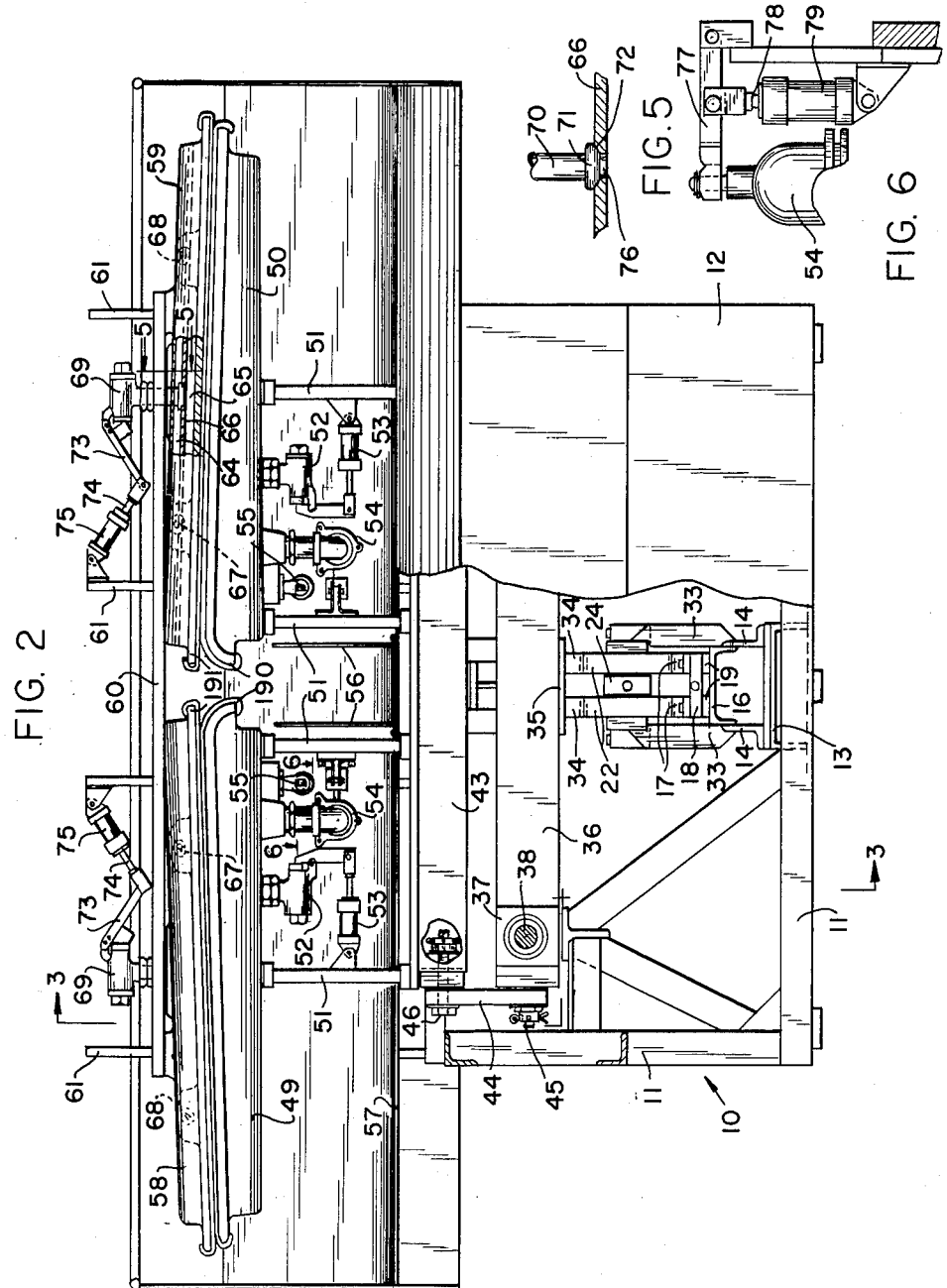

March 31, 1964   T. W. CARSKADON   3,126,658
TROUSER LEG PRESSING MACHINE

Filed Jan. 9, 1962   9 Sheets-Sheet 3

INVENTOR
T. W. CARSKADON

BY
ATTORNEYS

March 31, 1964  T. W. CARSKADON  3,126,658
TROUSER LEG PRESSING MACHINE

Filed Jan. 9, 1962  9 Sheets-Sheet 4

INVENTOR
T. W. CARSKADON

BY
ATTORNEYS

March 31, 1964 T. W. CARSKADON 3,126,658
TROUSER LEG PRESSING MACHINE
Filed Jan. 9, 1962 9 Sheets-Sheet 5

INVENTOR
T. W. CARSKADON

BY
*Ayers Dowell I & II*
ATTORNEYS

March 31, 1964 T. W. CARSKADON 3,126,658
TROUSER LEG PRESSING MACHINE
Filed Jan. 9, 1962 9 Sheets-Sheet 6
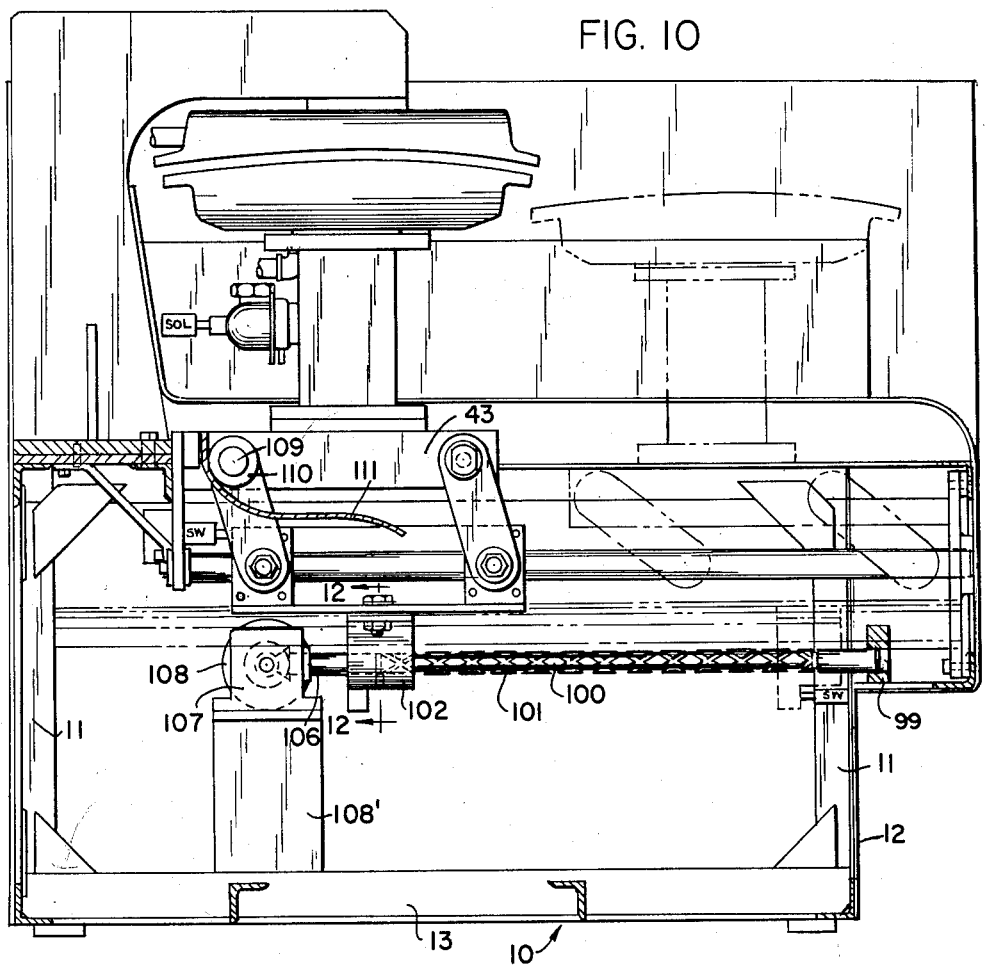
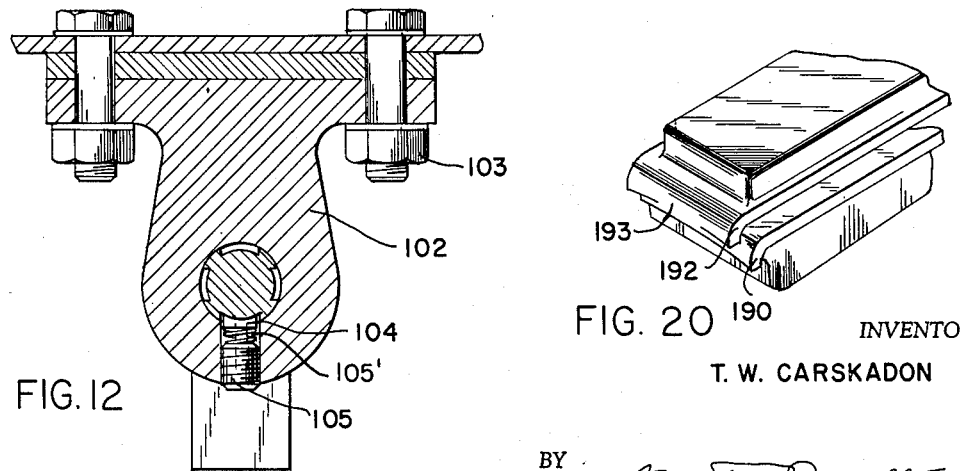
INVENTOR
T. W. CARSKADON
BY
ATTORNEYS

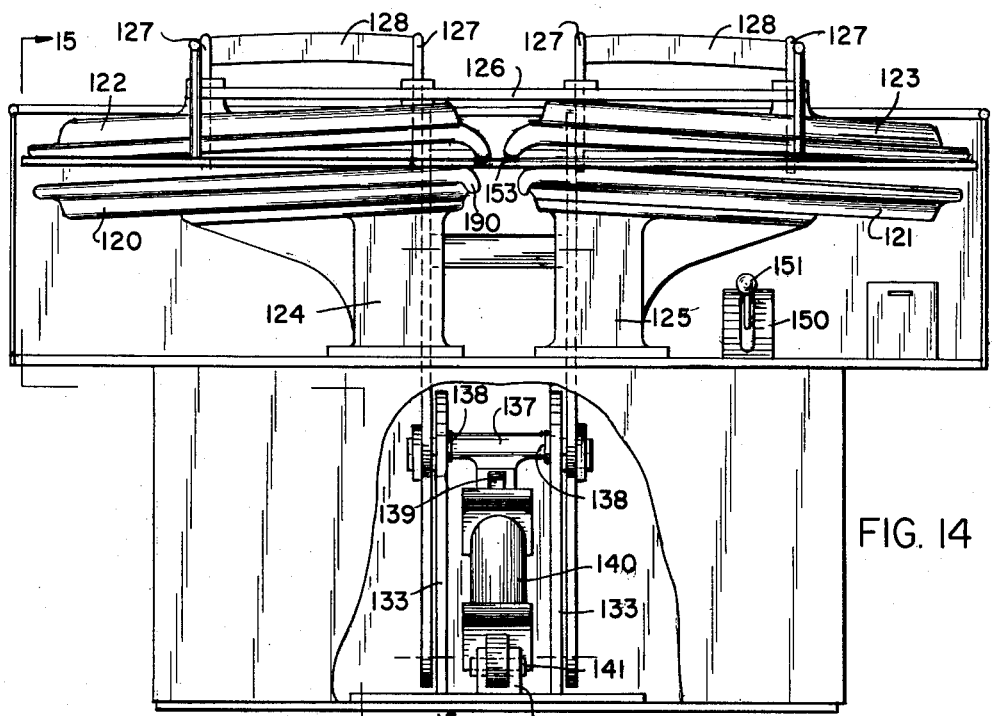

March 31, 1964   T. W. CARSKADON   3,126,658
TROUSER LEG PRESSING MACHINE
Filed Jan. 9, 1962   9 Sheets-Sheet 8

INVENTOR
T. W. CARSKADON

BY
ATTORNEYS

March 31, 1964 T. W. CARSKADON 3,126,658
TROUSER LEG PRESSING MACHINE
Filed Jan. 9, 1962 9 Sheets-Sheet 9

INVENTOR
T. W. CARSKADON

BY *[signature]*
ATTORNEYS

United States Patent Office 3,126,658
Patented Mar. 31, 1964

3,126,658
TROUSER LEG PRESSING MACHINE
Thomas W. Carskadon, 99 E. Kanawha Ave.,
Columbus, Ohio
Filed Jan. 9, 1962, Ser. No. 165,992
4 Claims. (Cl. 38—5)

This invention relates to wearing apparel and the care thereof in order to maintain it in fresh attractive condition at all times, said particularly to the care of suits, or portions thereof, and especially the legs of trousers or pants.

The invention is directed primarily to the pressing of the leg portions of pants, and to the equipment employed in such pressing operations designed to make it possible to press unlimited or commercial quantities to give proper appearance to trousers or pants profitably and in substantial volume.

Trousers or pants have been pressed in various ways including with flat irons, steam irons, utility pressers, and the like, but these have presented problems because of weight, size, capacity, inefficiency of operation including too much time on the part of the operator, the necessity for skilled labor, and the increased cost of labor and material.

It is an object of the invention to overcome the problems encountered and to provide equipment for limited or unlimited pressing of legs of trousers or pants which can be accomplished by unskilled labor with a minimum of effort, in a minimum of time, and at the least possible cost.

Another object of the invention is to provide a pair of spaced bucks and a cooperating pair of spaced pressing heads with the bucks and heads being movable relative one to the other.

Another object is to provide a press which may be automatically operated under the influence of coin mechanism for use in a do-it-yourself laundry.

Another object of the invention is to provide relatively simple and inexpensive presses, some of which can be operated manually and others automatically, and by which the pressing of trousers or pants can be done with safety and comfort.

A further object of the invention is to provide a press having a buck which can be moved from a loaded position beneath a fixed head and into contact with such head and returned for performing the pressing operation, and a manual press having a fixed buck and a movable head which can be moved into contact with such buck, as well as pressers of such character which can be operated pneumatically or electrically.

Other objects and advantages of the invention will be apparent from the following description taken in conjunction with the accompanying drawings wherein:

FIG. 1 is a perspective view illustrating one embodiment of the invention with movable bucks, FIG. 2 is an enlarged front elevation with portions broken away, FIG. 3 is an enlarged vertical section on the line 3—3 of FIG. 2, FIG. 4 is a fragmentary horizontal section on line 4—4 of FIG. 3, FIG. 5 is an enlarged fragmentary detail on the line 5—5 of FIG. 2, FIG. 6 is a horizontal section on the line 6—6 of FIG. 2, FIG. 7 is a schematic view of the wiring diagram, FIG. 8 is a diagrammatic view of the piping, FIG. 9 is an enlarged fragmentary view of a modified form of the invention, FIG. 10 is a horizontal section on the line 10—10 of FIG. 9, FIG. 11 is a section on line 11—11 of FIG. 9, FIG. 12 is an enlarged vertical detail section on the line 12—12 of FIG. 10, FIG. 13 is a schematic view of the electrical system of the device of FIG. 9, FIG. 14 is a front elevation of a further modified form of the invention, FIG. 15 is a section on line 15—15 of FIG. 14, FIG. 16 is a front elevation of a further modified form of the invention.

FIG. 20 is a fragmentary perspective of a cooperating head and buck.

Figure 1:
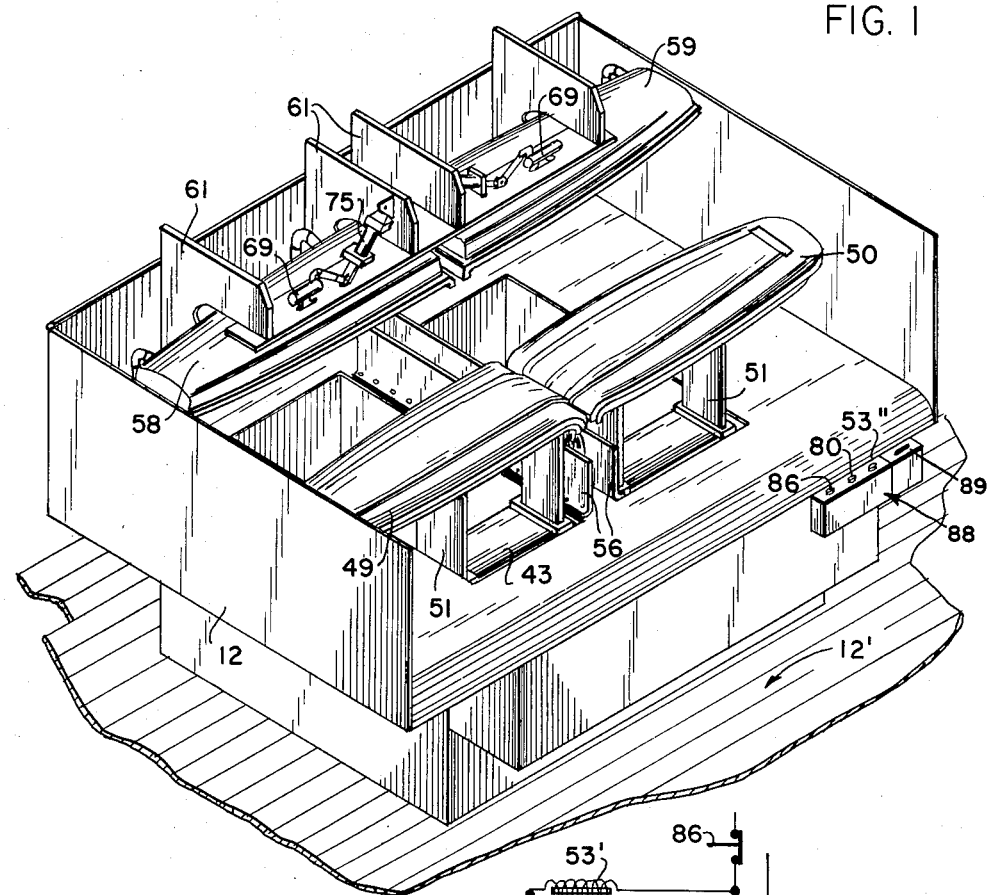
Figure 7:
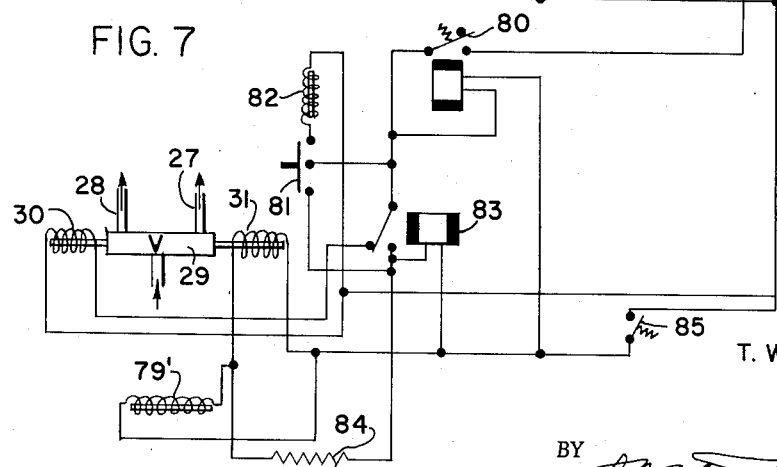
Figure 3:
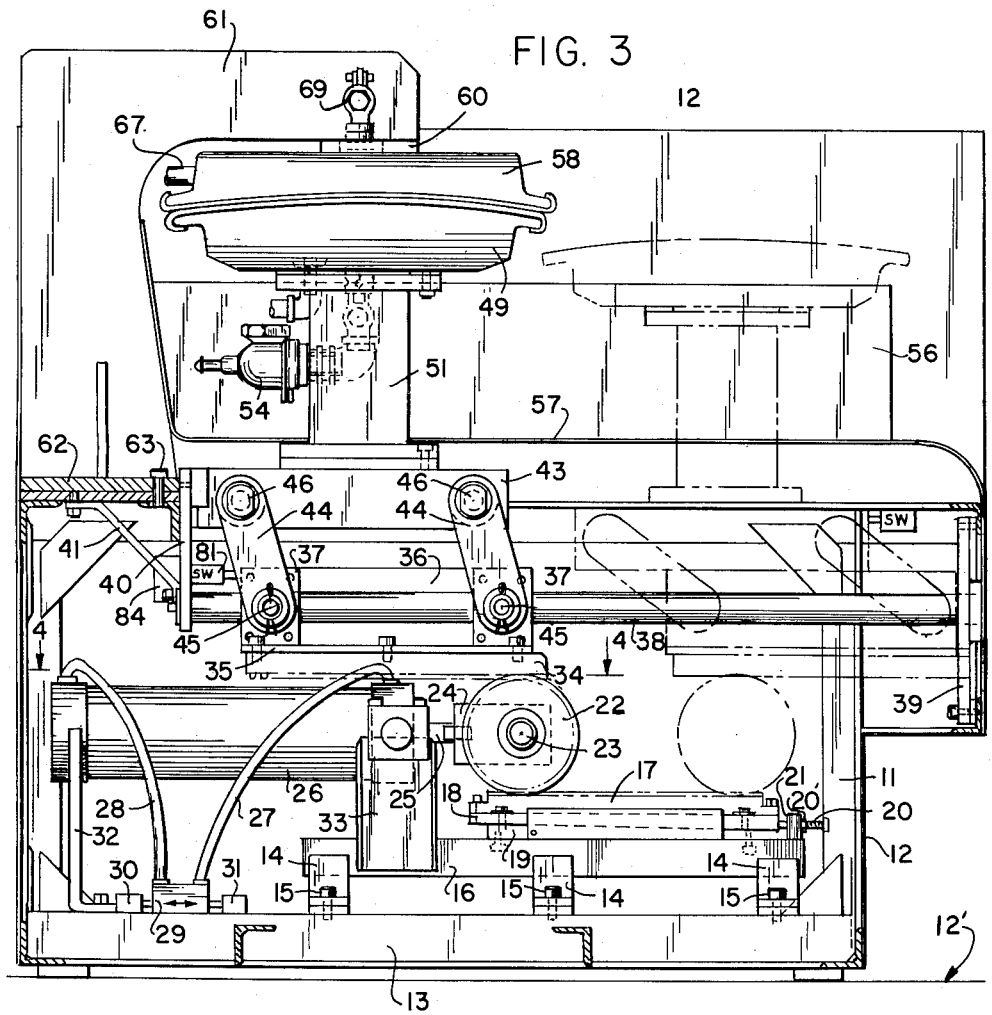
Figure 4:
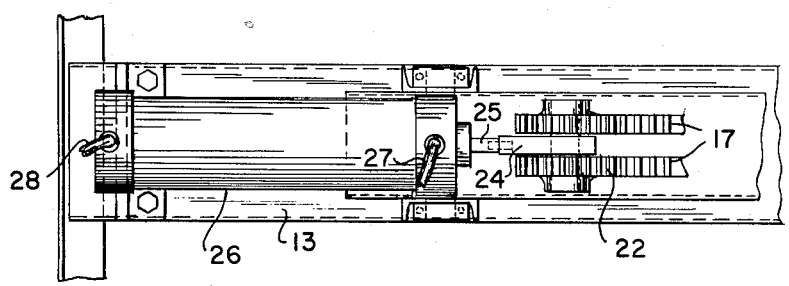
Figure 13:
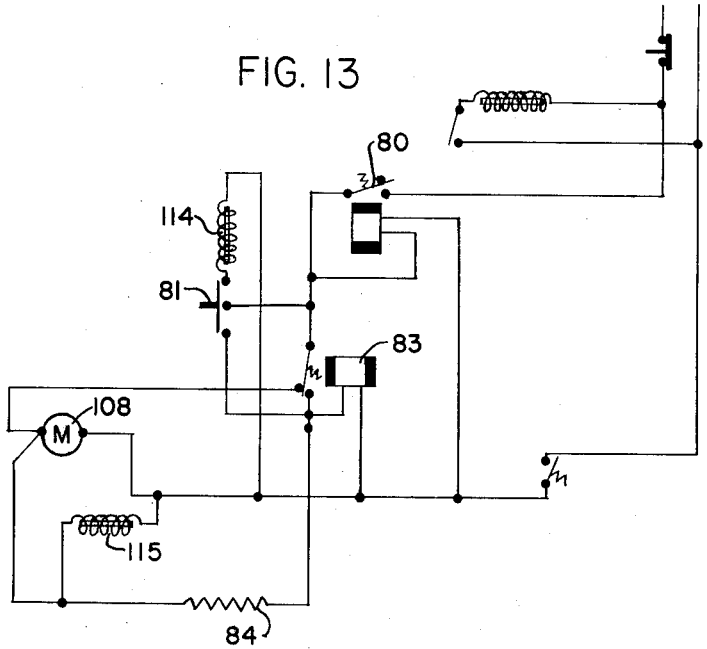
Figure 8:
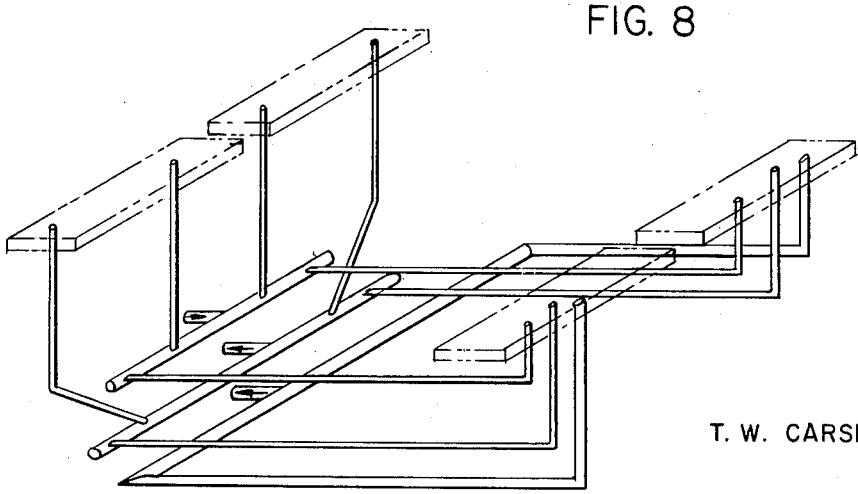

Briefly stated, the invention is directed to the efficient simultaneous pressing of both of the legs of a pair of trousers or pants, and is an addition to that of Patent No. 2,949,688, and includes pairs of spaced bucks and cooperating pairs of spaced heads with the bucks and heads relatively movable, including in one embodiment the bucks disposed in a forward lowered position where they can have the legs of the trousers placed thereon and thereafter the bucks can be moved rearwardly to underlie the heads and then moved upwardly into pressing relation with the heads to order to perform the pressing operation, the dual bucks with adjacent extremities in close proximity but spaced to permit the waist portion of the trousers or pants to be disposed downwardly between such adjacent ends of the bucks.

In other embodiments, spaced bucks are mounted in fixed position with heads which are movable downwardly into pressing relation with such fixed bucks to perform the pressing operation and in each embodiment with movement produced either manually, or automatically, or by fluid pressure or by electrical means.

With continued reference to the drawings the present invention is a machine for independently and simultaneously pressing both legs of a pair of trousers and comprises a base 10 constructed of structural angle members 11 and covered by a sheet metal housing 12. A loading station 12' is located adjacent to the front of the base 10 and defines an area in which an operator stands to load the machine.

An inverted channel member 13 is welded or otherwise attached to the lower portion of the base 10 along the longitudinal axis thereof from front to rear. A series of brackets 14 are attached to the upper surface of the channel 13 by fasteners 15 and on such brackets is mounted a smaller rack supporting channel member 16. A pair of spacer parallel racks 17 mounted on a slide 18 are adjustably carried by slide blocks 19 fixed to the rack supports 16. The slide 18 is adapted to be adjusted lengthwise of the slide blocks 19 by a bolt 20 rotatably connected at one end of the slide 18 and threadedly received within a fixed stop 21. A lock nut 20' is provided for securing such slide in adjusted position.

The racks 17 mesh with a pair of spaced pinions 22 fixed on a shaft 23 journaled in a block 24 and having means to prevent endwise movement. The block 24 is attached to one end of a piston rod 25 carried within a reversible fluid operated cylinder 26 and adapted to be extended and retracted thereby. Cylinder 26 is adapted to be operated in either direction by introducing fluid into the cylinder through either line 27 or 28 and relieving the pressure within the cylinder through the opposite line, the direction of flow being controlled by a conventional distributing valve 29 under the influence of a pair of solenoids 30 and 31. The cylinder 26 is supported at one end by a bracket 32 mounted on the channel member 13 and at the other end by a pair of brackets 33 fixed to the rack support 16.

A second pair of spaced parallel racks 34 are fixed to a plate 35 mounted on the bottom of a generally rectangular frame 36. A pair of bushings or bearings 37 are mounted on each end of the frame 36 and such bearings slidably receive a rod 38 fixed to the base 10 and located along each side of the frame 36. The rods are mounted at one end on plates 39 supported by the angle members 11 at the front of the base and are supported at the other end by a bumper plate 40 depending from the top of the base and supported by a brace 41.

A platform 43 is mounted on the frame 36 and normally rests thereon but as such platform is moved toward the rear of the machine the platform 43 is adapted to move upwardly into spaced relation with the frame 36. In order to do this, the platform 43 and frame 36 are substantially the same length and are connected at each end by a pair of links 44. Such links are pivotally connected at their lower ends to stub shafts 45 carried by the bearings 37 of the frame 36 and are pivotally connected at their upper ends by pivot pins 46 to the platform 43.

A pair of bucks 49 and 50 supported on columns 51 are mounted on the platform 43 in spaced relation to each other and to such platform. The upper surfaces of such bucks are of a configuration to accommodate one leg of a pair of trousers and are separated only enough to accommodate the upper or trunk portion of such trousers. Each buck is provided with a steam valve 52 operated by a fluid cylinder 53 under the influence of a solenoid 53′ controlled by the operator of the machine through a switch 53″ to permit steam to be applied to the trouser leg to remove wrinkles therefrom. Each buck also is provided with a vacuum valve 54 for removing steam from the buck and drying the trouser legs and a drain valve 55 for removing condensation. A pair of spaced parallel guides 56 are mounted on the upper surface 57 of the housing 12 and such guides protect the trunk of the trousers during the movement of the bucks.

A pair of fixed presser heads 58 and 59 are mounted in spaced relation above the rearmost position of the bucks and such heads are fixed to a plate 60 carried by a series of brackets or yoke members 61 mounted on a plate 62 attached to the base 10 by fasteners 63. Each of the presser heads is divided into two compartments 64 and 65 by a partition 66 whereby the upper compartment 64 forms a steam header having a steam inlet line 67 and a steam exhaust line 68. If desired the exhaust line 68 may be under the influence of a conventional pressure sensitive relief valve (not shown) to maintain the pressure in the upper compartment at a predetermined level. In order to permit steam under pressure contained within the upper compartment 64 to enter the lower compartment 65 to perform the pressing operation, a valve body 69 is mounted on each presser head and has a rod 70 (FIG. 5) extending downwardly through the upper compartment and terminating in a valve 71. Such valve normally engages a valve seat 72 in the partition 66 but when the valve body 69 is operated by a link 73 under the influence of a piston rod 74 and cylinder 75, the valve 71 is raised and steam is admitted into the lower compartment 65 through an opening 76 in the partition.

When the pressing operation has been completed, steam which has penetrated the cloth of the trousers and into the bucks 49 and 50 is exhausted through vacuum valve 54 regulated by a lever 77 under the influence of a piston rod 78 and cylinder 79 controlled by a solenoid 79′. The exhausting of the bucks cools and dries the cloth of the trousers so that by the time the bucks return to their normal position, the trousers are ready to be removed.

A coin box 88 is mounted on the front of the machine adjacent to the operator's station 12′ and includes a conventional coin receptacle 89 adapted to receive one or more coins having a sum of a predetermined value. The switches 53″, 80 and 86 are mounted in the coin box 88 and are controlled by the coin mechanism therein.

In the operation of the device, one or more coins of a predetermined value are inserted in the coin box 88 to permit operation of the machine. The trousers to be pressed are then spread so that one leg is on each buck and the steam switch is closed to permit steam to enter the bucks so that the wrinkles may be removed from the trousers. After the wrinkles have been removed, the start switch 80 is closed to energize solenoid 30 and introduce fluid into cylinder 26 through line 27 to retract piston rod 25 and cause pinions 22 which are in mesh with the racks 17 and 34 to move frame 36 rearwardly. The platform 43 carried by frame 36 is likewise moved rearwardly until it strikes bumper plate 40 whereupon continued rearward movement of frame 36 will cause links 44 to raise platform 43 until the bucks 49 and 50 carried thereon engage fixed heads 58 and 59. At the time of engagement between the bucks and the heads, platform 36 contacts a switch 81 which energizes a pair of solenoids 82 to operate cylinders 75 and open steam valves 71 to complete the pressing operation. Simultaneously, platform 36 closes a relay 83 and energizes a time delay 84 which after a period of time activates solenoid 31 to reverse the flow of fluid to cylinder 26 and energize vacuum valves 54 in the bucks 49 and 50. As the frame 36 moves forwardly, switch 81 is opened to close steam valves 71 and when such frame reaches its normal position, it closes cut off switch 85 which stops all operation until another coin is inserted. An emergency stop switch 86 may be provided to stop all operation of the machine.

Instead of racks and pinions FIGS. 9–13 disclose a modified form of the invention in which the platform 36 is adapted to be moved rearwardly and forwardly of the machine by a shaft 100 having spiral reversing threads 101 along the major portion of the length thereof. A depending projection 102 is attached to the plate 35 by bolts or other fasteners 103 and such projection has one or more followers 104 received within the spiral threads 101 and pivotally mounted in a threaded socket 105 carried by the projection 102. A spring 105′ is interposed between the follower 104 and the socket 105 to maintain such follower in contact with the threads 101 at all times.

The forward end of the shaft 100 is journaled in a bearing 99 at the front of the machine and the opposite end of the shaft is journaled in a bearing 106 carried by a gear reduction 107. Power is supplied to the gear reduction 107 by an electrical motor or other source of power 108 mounted on a stand 108′ secured to the base 10.

In order for the platform 43 to make a smooth transition from horizontal travel to vertical travel the rearmost pivot pin 46 on each side of such platform is provided with a stub shaft 109 on which a roller 110 is rotatably mounted. As the frame 36 with the platform 43 resting thereon moves rearwardly rollers 110 are adapted to engage a guide 111 mounted on each side of base 10. In this manner the rollers 110 traveling in the guides 111 gradually raise platform 43 and the spaced bucks carried thereon until the bucks are in pressing relation with the heads 58 and 59.

If desired the steam valves 54 and 69 may be operated by solenoids 113 and 114 respectively instead of by fluid cylinders and links as described in the previous modification.

In the operation of this modification, a pair of trousers are spread on the bucks 49 and 50 and the steam switch 53″ is operated to remove the wrinkles as previously described. After the wrinkles have been removed the start switch 80 is closed to energize the motor 108 which rotates the shaft 100 through the gear reduction 107 until the frame 36 engages and closes switch 81 at which time the followers 104 have reached the end of the threads 101 and the bucks have been raised into intimate contact with the pressing heads 58 and 59.

The closing of switch 81 stops the motor 108 and simultaneously energizes relay 83 which directs electrical current to the time delay 84 which after a period of time activates solenoid 115 to open the vacuum valve 54 and re-energizes the motor 108. Such motor again rotates the shaft 100 in the same direction and the followers 104 follow the reverse spiral threads to return the frame 36 and platform 43 to their normal position.

As the frame 36 moves forwardly the switch 81 is opened to de-energize solenoid 114 and close the steam valves 71. When the frame reaches its normal position cut off switch 85 is closed and all operation is stopped until another coin in inserted.

FIGS. 14–19 disclose further modifications in which a pair of spaced bucks 120 and 121 are stationary and a pair of spaced pressing heads 122 and 123 are pivotally mounted in a manner to contact the bucks 120 and 121 in pressing relation. In the modification illustrated in FIGS. 14 and 15 the spaced bucks 120 and 121 are mounted on columns 124 and 125 respectively supported in fixed relation on the base 10.

The presser heads 122 and 123 are secured to a plate 126 supported by pairs of yokes 127 with each pair of yokes being connected by a bridge 128. The inner yoke of each pair is connected by a pivot pin 129' to a first link 129 and by a pin 130 to a second link 131. The first pair of links 129 are pivotally mounted by pins 132 to a pair of cams or guide members 133 mounted on the base 10. The second pair of links 131 are shorter than links 129 and are pivotally connected at their lower ends by shaft 134 to connecting links 135, the opposite ends of which are connected by pins 136 to the links 129 intermediate the ends thereof. In order to cause movement of the presser heads 122 and 123, a spacer 137 is carried by shaft 134 between the second pair of links 131 and guide rollers 138 are rotatably mounted on opposite ends of the shaft 124. Such rollers are adapted to follow the upper contour of the guide members 133 including an arcuate surface 144, a slot or recess 145 and a stop 146. In order to do this the spacer 137 is mounted at one end of a piston rod 139 extendable and retractable in a fluid operated cylinder 140 pivotally mounted by pins 141 to a bracket 142 on the base 10.

When the machine is in normal inoperative position the rollers 138 engage the arcuate surface 144 of the guide members 133 adjacent to the rear end thereof. Upon the introduction of fluid into the upper end of cylinder 140 the spacer 137 exerts a forward pull on shaft 134 to pivot the links 129 and 131 about the pins 132 until the rollers 138 engage the stop 146 whereupon the rollers will move downwardly into the recess 135 to move the links 131 lengthwise of the links 129 to pivot the yokes 127 about the pins 129' and cause the presser heads 122 and 123 to intimately engage bucks 120 and 121 to accomplish the pressing action.

The structure of this modification may be operated automatically as previously described in the foregoing modification or if desired a manual control 150 having an operating lever 151 may be provided so that an operator may control the different steps involved in the pressing of a pair of trousers.

In order to prevent injury to the operator of the pressing machine a safety guard 153 is connected to one end of a pair of L-shaped brackets 154 and the opposite ends of such L-shaped brackets are mounted by a pivot 155 to the outermost yokes 127. The brackets 154 normally rest on stops 156 on each yoke and are held against such stops by gravity. The guard 153 is connected to such brackets below the level of the pressing heads and if such guard contacts an object the brackets 154 will be raised from the stop 156 and will contact a switch 157 connected to the source of electricity for the machine to stop all operations.

Figure 16:
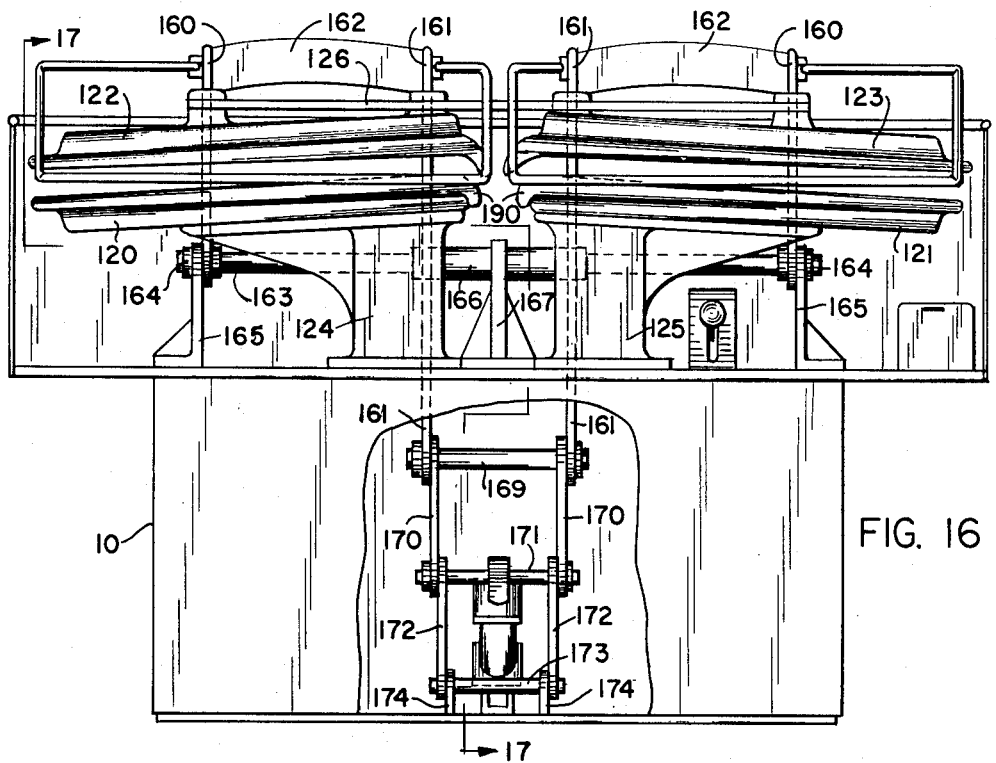
Figure 17:
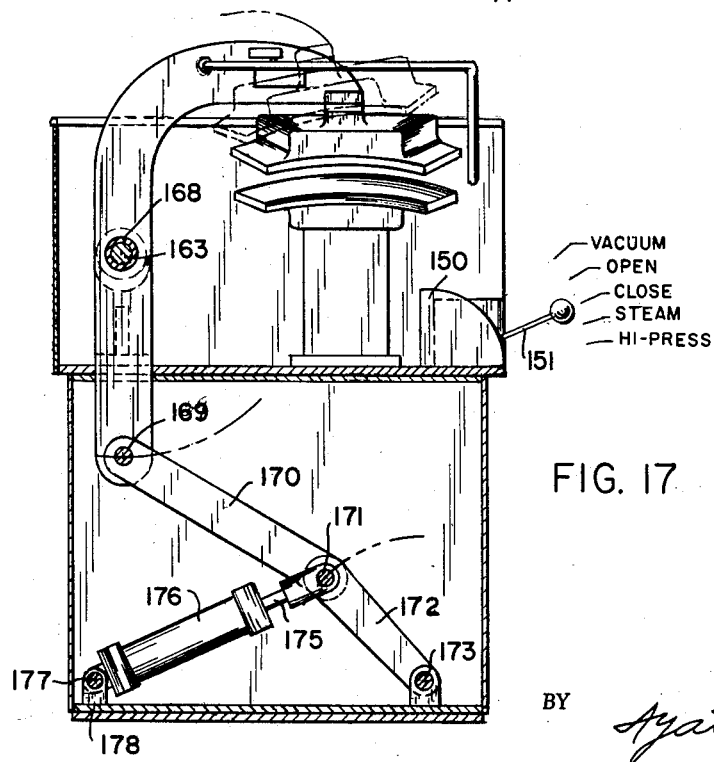
FIG. 17 is a section on line 17—17 of FIG. 16.

In the modification disclosed in FIGS. 16 and 17 the bucks 120 and 121 are mounted on columns 124 and 125 respectively and the presser heads 122 and 123 are mounted on a plate 126. Each of the presser heads is supported by an outer yoke 160 and an inner yoke 161 with the outer and inner yokes being connected by a bridge 162. The outer yokes 160 are attached to a shaft 163 at the rear of the machine and such shaft has its opposite ends journaled in bearings 164 supported by brackets 165 mounted on the top of the base 10. A sleeve 166 is fixed centrally of the machine to a bracket 167 mounted on the base 10 and such sleeve provides a bearing for the shaft 163.

The inner yokes 161 are provided with openings 168 in which the sleeve 166 is received and the lower ends of such yokes extend downwardly into the base portion of the machine where they are rotatably mounted on a connecting shaft 169. A pair of forwardly extending links 170 each having one end rotatably connected to the shaft 169 and the opposite end rotatably mounted on a shaft 171. A second pair of links 172 are rotatably mounted at their upper ends at the shaft 171 and the opposite ends of such links are rotatably carried by shaft 173 such shaft being supported by brackets 174 mounted on the base 10.

In order to move the head to a pressing position the shaft 171 is connected to a piston rod 175 carried by a fluid cylinder 176 the lower end of which is connected by a pin 177 to a bracket 178 which is welded or otherwise secured to the base 10. The normal inoperative position of the pressing heads 122 and 123 is illustrated in phantom in FIG. 17 and in order to move the head into pressing position the piston rod 175 is retracted to move shaft 171 rearwardly. Such movement of the shaft 171 causes links 172 to rotate about shaft 173 and impart a rearward movement to the links 170. Rearward movement of links 170 moves the lower ends of yokes 161 to pivot the presser head about the shaft 163 and into contact with the bucks 120 and 121. If desired this modification of the machine may have automatic operation as described in the first two modifications or it may be manually controlled as described in the third modification.

Figure 18:
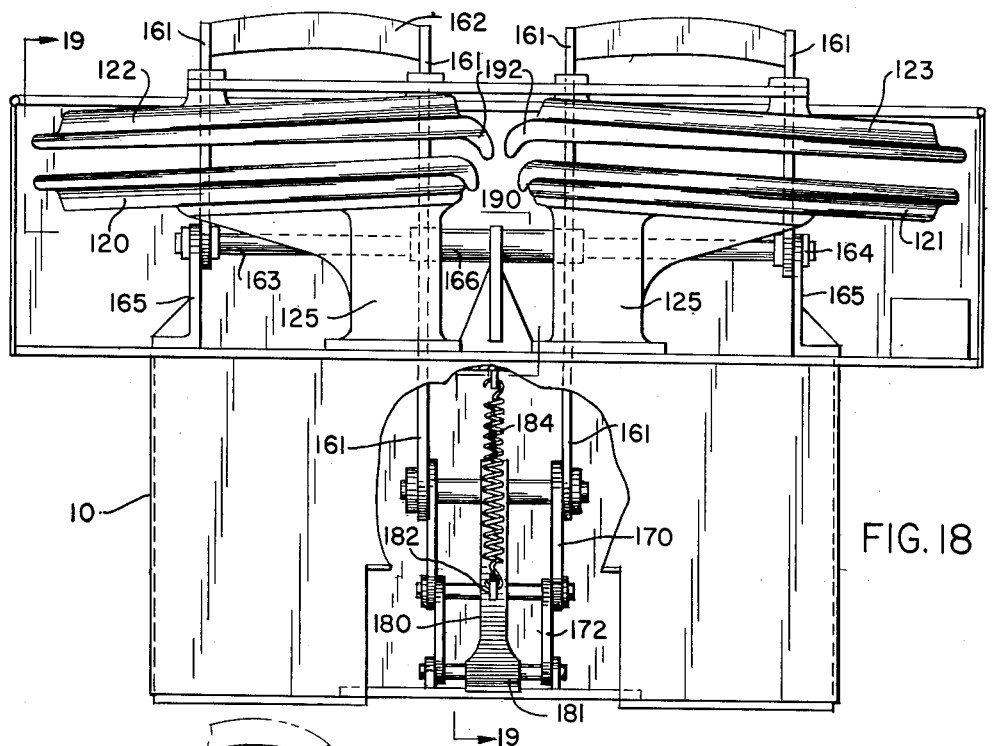
FIG. 18 is a front elevation of a further modified form of the invention.
Figure 19:
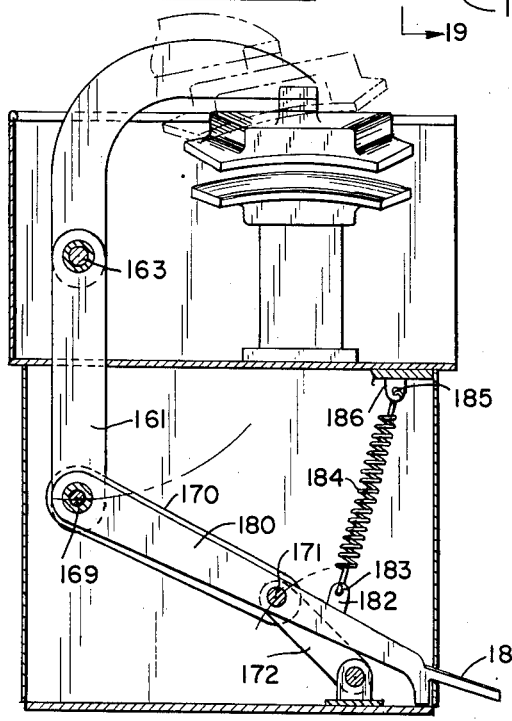
FIG. 19 is a fragmentary section on line 19—19 of FIG. 18.

FIGS. 18 and 19 disclose a modification of the machine which is similar to the modification illustrated by FIGS. 16 and 17 with the exception that instead of being operated by a fluid cylinder it is adapted to be operated by the foot of the operator. In order to do this a central lever 180 is pivotally connected to shafts 169 and 171 and such lever extends outwardly beyond links 172 and through the front of the machine. The outer end of the lever 180 is provided with an enlarged foot engaging portion 181 so that when such portion is depressed links 170 and 172 will move the yokes 161 to pivot the presser heads about the shafts 163 and into contact with the bucks 120 and 121. In order to return the presser head to its normal position the lever 180 is provided with an upstanding lug 182 having an opening 183 in which is received one end of a spring 184 the opposite end of which is connected through an opening 185 to a lug 186 depending upon the top of base 10.

Figure 9:
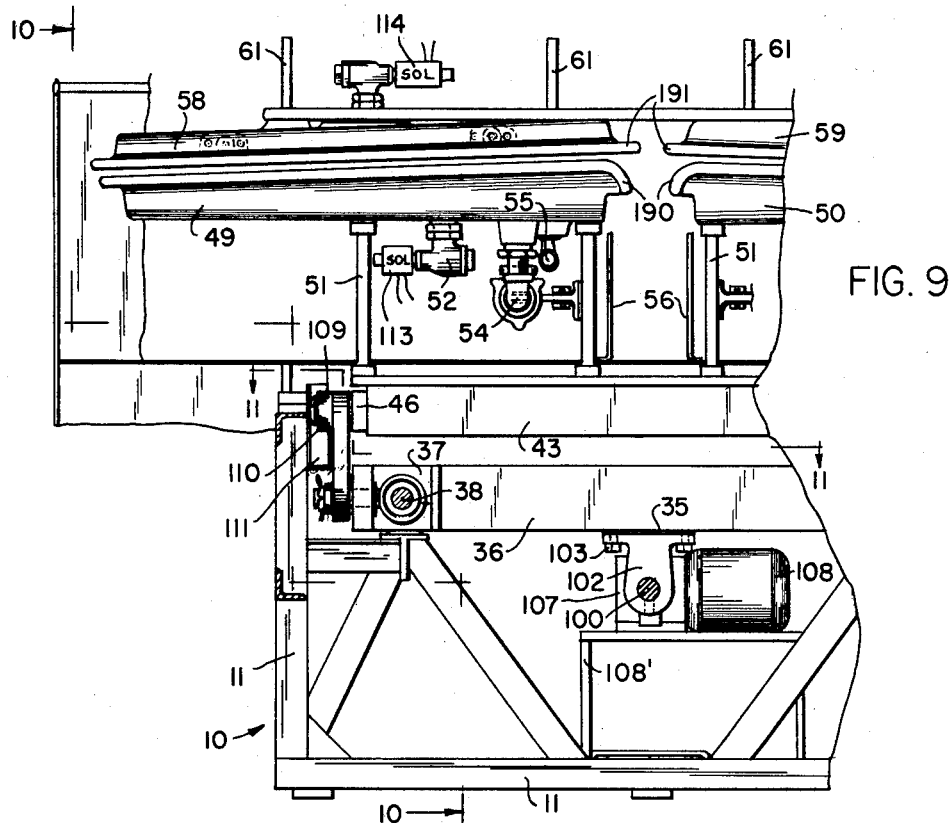
Figure 11:
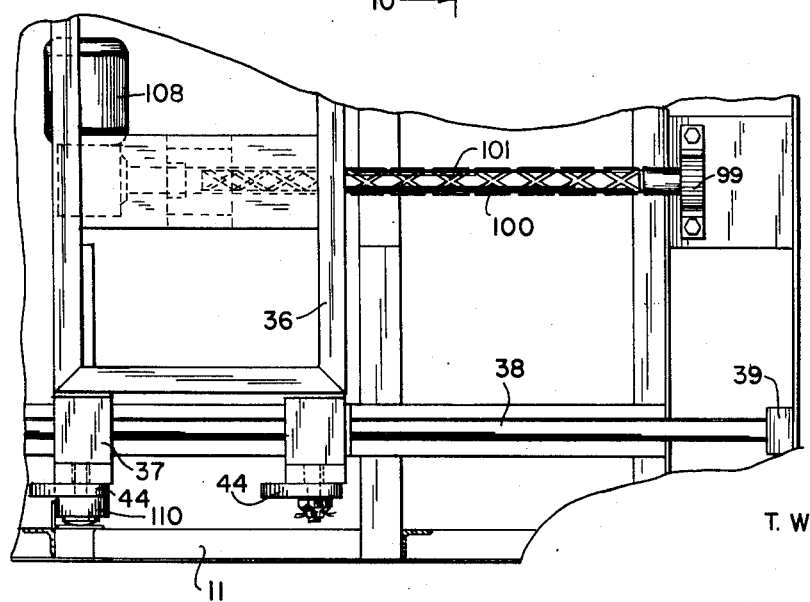

As illustrated in FIG. 20, the bucks of the various modifications are provided with a downwardly curved portion 190 along their inner edges to permit the trunk portion of the trousers to hang evenly between adjacent bucks without sharp corners which create wrinkles in the trousers. As illustrated in FIGS. 1, 2 and 9 the cooperating heads terminate at their inner ends in a substantially flat projection 191 which increases the length of the heat applying heads and thus presses the crotch portion of the trousers. If desired, as illustrated in FIGS. 14, 16, 18 and 20, the cooperating heads are provided with a downwardly curved portion 192 corresponding to the downwardly curved portion 190 of the bucks and which will form the crease along a greater portion of the trousers and will hold the trousers during the pressing operation. The crotch portion of the trousers normally extends straight across between adjacent bucks and in order to compensate for such crotch portion the heads are provided with a central cut out 193 in order to permit the downwardly curved portion 192 to engage the trousers without the central portion engaging the trousers.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A machine for simultaneously independently pressing the leg portions of a pair of trousers comprising a base, a pair of bucks mounted on said base and adapted to support the trousers, each buck supporting one leg of the trousers substantially to the crotch portion thereof, the top surfaces of said bucks being substantially planar, said bucks having closely spaced contiguous ends separated sufficiently to accommodate the thickness of the material of the waist portion of the trousers, a pair of pressing heads mounted on said base, one head adapted selectively to pressingly engage one buck and the other head adapted simultaneously to pressingly engage the other buck, said bucks having initial aligned positions adjacent to one side of said machine, said pressing heads normally being spaced from said bucks and at a higher elevation thereto, automatic operating means for moving said bucks simultaneously into pressing engagement with said heads, and subsequently returning said bucks to their initial positions.

2. A machine for simultaneously independently pressing the leg portions of a pair of trousers comprising a base, a pair of aligned bucks mounted on the base and adapted to support the trousers, one leg of said trousers being supported substantially to the crotch portion thereof by each buck, the top surfaces of said bucks being substantially planar, said bucks having closely spaced contiguous ends separated sufficiently to accommodate the thickness of the material of the waist portion of the trousers, at least one pressing head mounted for simultaneous pressing engagement with said bucks, said bucks initially being positioned adjacent to one side of said machine, said pressing head normally being spaced from said bucks, automatic operating means for causing said bucks to move relative to said head into pressing engagement to press the leg portions of said trousers and subsequently to return to their initial positions.

3. The structure of claim 2 in which said operating means comprises a movable platform mounting said bucks, a frame slidably mounting said platform on said base, and means for moving said platform relative to said base.

4. The structure of claim 3 in which said means for moving said platform includes means for moving said bucks to a position beneath said pressing head, means for raising and lowering said bucks into and out of pressing engagement with said head, and means for returning said bucks to a position adjacent one side of said machine.

References Cited in the file of this patent

UNITED STATES PATENTS

| | | |
|---|---|---|
| Re. 25,357 | Carskadon | Mar. 19, 1963 |
| 1,841,005 | Braun | Sept. 12, 1932 |
| 2,005,043 | Mall | June 18, 1935 |
| 2,022,176 | Baldwin | Nov. 26, 1935 |
| 2,030,595 | Johnson | Feb. 11, 1936 |
| 2,124,898 | Shepard | July 26, 1938 |
| 2,307,370 | Hale | Jan. 5, 1943 |
| 2,765,549 | Binns et al. | Oct. 9, 1956 |
| 2,859,545 | Williams | Nov. 11, 1958 |
| 2,949,688 | Carskadon | Aug. 23, 1960 |
| 3,001,304 | Turner et al. | Sept. 26, 1961 |